(12) United States Patent
Wu et al.

(10) Patent No.: US 10,324,681 B2
(45) Date of Patent: Jun. 18, 2019

(54) METHOD, APPARATUS AND MEDIUM FOR CONTINUOUS PLAYBACK OF SOUND FILE

(71) Applicant: TENCENT TECHNOLOGY (SHENZHEN) COMPANY LIMITED, Shenzhen (CN)

(72) Inventors: Xiayu Wu, Shenzhen (CN); Rong Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/116,663

(22) PCT Filed: Feb. 16, 2015

(86) PCT No.: PCT/CN2015/073168
§ 371 (c)(1),
(2) Date: Aug. 4, 2016

(87) PCT Pub. No.: WO2015/127883
PCT Pub. Date: Sep. 3, 2015

(65) Prior Publication Data
US 2016/0350069 A1 Dec. 1, 2016

(30) Foreign Application Priority Data
Feb. 26, 2014 (CN) .......................... 2014 1 0067382

(51) Int. Cl.
*G06F 17/00* (2019.01)
*G06F 3/16* (2006.01)
(Continued)

(52) U.S. Cl.
CPC ............. *G06F 3/165* (2013.01); *G05B 15/02* (2013.01); *G11B 20/10527* (2013.01); *G11B 27/105* (2013.01)

(58) Field of Classification Search
CPC . G11B 27/36; G11B 27/038; G06F 17/30761; G06F 3/165; G05B 15/02
See application file for complete search history.

(56) References Cited

U.S. PATENT DOCUMENTS

| 7,551,525 B1 * | 6/2009 | Jellard | G11B 7/0946 |
| | | | 369/30.1 |
| 9,286,942 B1 * | 3/2016 | Hayes | G11B 27/038 |

(Continued)

FOREIGN PATENT DOCUMENTS

| CN | 101882438 A | 11/2010 |
| CN | 102143123 A | 8/2011 |

(Continued)

OTHER PUBLICATIONS

The World Intellectual Property Organization (WIPO) International Search Report for PCT/CN2015/073168 dated Jun. 3, 2015 pp. 1-3.

(Continued)

*Primary Examiner* — Thomas H Maung
(74) *Attorney, Agent, or Firm* — Anova Law Group, PLLC

(57) ABSTRACT

A method and an apparatus for continuous playback of a sound file are described. The method includes: receiving a first playback instruction, where the first playback instruction is used for playing continuously a sample sound file; obtaining, according to the first playback instruction, a time point for ending continuous playback corresponding to the first playback instruction; searching, according to the time point for ending the continuous playback, for a playback time value of the sample sound file corresponding to the time point; and starting, at the time point for ending the continuous playback, to play sound data of the sample sound file after the playback time value.

19 Claims, 3 Drawing Sheets

(51) Int. Cl.
    *G11B 20/10*     (2006.01)
    *G11B 27/10*     (2006.01)
    *G05B 15/02*     (2006.01)

(56) References Cited

U.S. PATENT DOCUMENTS

| | | | |
|---|---|---|---|
| 9,451,230 B1 * | 9/2016 | Henderson | H04N 9/802 |
| 2006/0272479 A1 * | 12/2006 | Takatsuka | G11B 27/105 |
| | | | 84/461 |

FOREIGN PATENT DOCUMENTS

| | | |
|---|---|---|
| CN | 103327419 A | 9/2013 |
| EP | 2416581 A1 | 2/2012 |
| KR | 100724651 B1 | 6/2007 |

OTHER PUBLICATIONS

The State Intellectual Property Office of the People's Republic of China (SIPO) Office Action 1 for 201410067382.X dated Jul. 31, 2018 6 Pages (including translation).

\* cited by examiner

METHOD, APPARATUS AND MEDIUM FOR CONTINUOUS PLAYBACK OF SOUND FILE

CROSS REFERENCE TO RELATED APPLICATIONS

This application is a national stage application of PCT application PCT/CN2015/073168, filed on Feb. 16, 2015, which claims the priority benefit of Chinese Patent Application No. 201410067382X, entitled "METHOD, APPARATUS AND MEDIUM FOR CONTINUOUS PLAYBACK OF SOUND FILE", filed on Feb. 26, 2014, the content of both of which is incorporated by reference herein in its entirety for all purposes.

FIELD OF THE TECHNOLOGY

The present disclosure belongs to the multimedia field, and in particular relates to a method, an apparatus and medium for continuous playback of a sound file.

BACKGROUND OF THE DISCLOSURE

When a multimedia sound event is processed, sometimes it is needed to play repeatedly a same sound file for multiple times in a very short time, so as to imitate or achieve some special live sound effects, such as a sound of continuous shooting.

An existing common method for playing repeatedly a sound file is as follows: when a playback request is received, a sound file corresponding to the request is called and played. This method is simple for implementation. However, when a time interval of the request is less than a value (for example, 100 milliseconds), because calling the sound file needs to consume an amount of time, a sound pause phenomenon is caused when the sound file is played repeatedly, and a playback effect is poor.

In order to avoid the sound pause phenomenon, a method for hosting and automatic continuous playback of a sound file is used in the existing technology. When a request of hosting and automatic continuous playback is obtained, the sound file is played automatically and continuously, the intermediate sound pause phenomenon no longer occur, and playback efficiency is high. However, when a playback end instruction is received, the system directly ends playing of the sound file and, thus, smooth transition performance of a sound signal is poor and simulation performance of a natural sound effect is poor.

SUMMARY

An embodiment of the present invention is to provide a method and an apparatus for continuous playback of a sound file, so as to solve problems in the existing technology that smooth transition performance of a sound signal is poor and simulation performance of a natural sound effect is poor, which occur easily when a sound file is played continuously.

The embodiments of the present invention are implemented by: a method for continuous playback of a sound file, used for playing continuously a sample sound file, and the method includes: at a terminal device having one or more processors and memory storing programs executed by the one or more processors; receiving a first playback instruction, the first playback instruction being used for playing continuously the sample sound file; obtaining, according to the first playback instruction, a time point for ending continuous playback corresponding to the first playback instruction; searching, according to the time point for ending the continuous playback, for a playback time value of the sample sound file corresponding to the time point; and starting, at the time point for ending the continuous playback, to play sound data of the sample sound file after the playback time value.

Another embodiment of the present invention is to provide a terminal device for continuous playback of a sound file, configured to play continuously a sample sound file, and the apparatus includes: a first receiving unit, configured to receive a first playback instruction, the first playback instruction being used for playing continuously the sample sound file; an obtaining unit, configured to obtain, according to the first playback instruction, a time point for ending continuous playback corresponding to the first playback instruction; a searching unit, configured to search, according to the time point for ending the continuous playback, for a playback time value of the sample sound file corresponding to the time point; and a playback unit, configured to: start, at the time point for ending the continuous playback, to play sound data of the sample sound file after the playback time value.

A non-transitory computer readable storage medium having stored therein one or more instructions, which, when executed by a terminal device, cause the terminal device to: receiving a first playback instruction, the first playback instruction being used for playing continuously the sample sound file; obtaining, according to the first playback instruction, a time point for ending continuous playback corresponding to the first playback instruction; searching, according to the time point for ending the continuous playback, for a playback time value of the sample sound file corresponding to the time point; and starting, at the time point for ending the continuous playback, to play sound data of the sample sound file after the playback time value.

By comparing with the existing technology, smooth transition performance of a sound signal can be better improved and simulation performance of a natural sound effect can be enhanced.

DESCRIPTION OF EMBODIMENTS

In order to make the objectives, technical solutions and advantages of the present disclosure more comprehensible, the present disclosure is described in the following in further detail with reference to the accompanying drawings and embodiments. It should be understood that, specific embodiments described herein are merely used to explain the present disclosure, but are not intended to limit the present disclosure.

A method for continuous playback of a sound file described in embodiments of the present invention is mainly applicable to loop/repeat playback of a single sound file, a playback frequency of which is relatively high, that is, a playback time interval of which is very short. As another application scenario to which the method may be applied, for example, continuous playback of multiple different sound files, and based on the inventive idea of the present disclosure, after a time point for ending playback is obtained, a playback time value of the sound files corresponding to the time point for ending the playback is obtained according to a playback order of the multiple sound files and playback duration of the sound files, and following sound data of the sound files that has not been played is played continuously. The present disclosure is described below in detail by using various embodiments.

Embodiment 1

Figure 1:
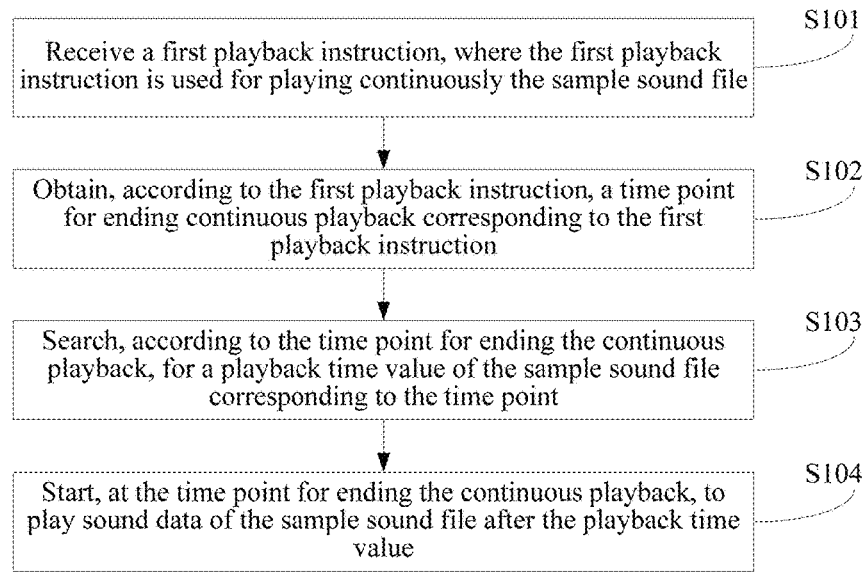
FIG. 1 is a flowchart of implementation of a method for continuous playback of a sound file according to a first embodiment of the present invention.

FIG. 1 shows an implementation process of a method for continuous playback of a sound file according to a first embodiment of the present invention, which can be used for playing continuously a sample sound file, and is described in detail as follows:

Step S101: receiving a first playback instruction, where the first playback instruction is used for continuously playing the sample sound file.

Specifically, the first playback instruction, according to presetting of a system, may be a click trigger instruction, or may be a continuous trigger instruction. The click trigger instruction may be a mouse click instruction or a keyboard click instruction, such as a mouse single-click or a keyboard single-click. The continuous trigger instruction may be continuous pressing of a mouse (pressing the left button of the mouse continuously for a period of time), or continuous pressing of a specific key of a keyboard (pressing the specific key of the keyboard continuously for a period of time).

The sample sound file used to be played continuously may be a single sound file, and may also be multiple sound files. When the sample sound file is a single sound file, the continuous playback refers to playing repeatedly the single sound file in a loop manner; when the sample sound file is multiple sound files, the continuous playback refers to playing the multiple sound files in sequence according to a preset playback order.

A condition for the continuous playback refers to whether a new playback instruction is received within a range of duration (the range of the duration may change accordingly according to sound files that need to be played when sound files of different duration are played continuously) after a previous playback instruction is received; if the playback instruction is received, a next sound file is played continuously.

The range of the duration may be a time length corresponding to duration of a to-be-played sound file, for example, equal to playback duration of a single sound file. During continuous playback, duration of a single shooting sound file is 94 milliseconds (may be less than playback duration of 100 milliseconds of a normal shooting sound file). If a new playback instruction is not received within 94 milliseconds, continuous playback of the sound file is ended; if a new playback instruction is received within 94 milliseconds, the shooting sound file is played continuously until no new playback instruction is received within continuous 94 milliseconds.

According to a preset time interval of continuous playback, when the sample sound file is a single sound file, if the preset time interval of continuous playback is greater than or equal to a playback time of a single sound file, the single sound file may be played completely in a loop manner within a time of loop playback; if the preset time interval of continuous playback is less than a playback time of a single sound file, some sound data of the single sound file may be played (this situation is common in an application scenario having a very high playback frequency, for example, a sound of continuous shooting is repeated playback of first part of sound data of a single shooting sound file).

When the sample sound file includes multiple different sound files, different ranges of duration may be set individually according to different sound lengths in the sample file. It is determined whether an instruction of continuous playback is received within each of the different set ranges of duration, and if the instruction of continuous playback is received, a next sound file in the sample sound file is played continuously; if the instruction of continuous playback is not received, a time point at which the set range of duration arrives is used as a time point for ending continuous playback corresponding to the first playback instruction.

In step S102: the system may obtain, according to the first playback instruction, a time point for ending continuous playback corresponding to the first playback instruction.

The step of obtaining, according to the first playback instruction, a time point for ending continuous playback corresponding to the first playback instruction may specifically be: detecting whether first duration during which an instruction used for playing the sample sound file is not received is greater than a preset value; and if the first duration during which an instruction used for playing the sample sound file is not received is greater than the preset value, selecting a corresponding time point, at which the first duration during which an instruction used for playing the sample sound file is not received is equal to the preset value, as the time point for ending the continuous playback.

Because the sample sound file includes two possibilities: a single sound file and multiple sound files, the preset value may be a fixed time value, for example, playback duration of a single sample sound file when being played continuously, and may also be multiple different time values. When the preset value is multiple different time values, each time interval for continuous playback of the sample sound file may be set, so that different preset values correspond to different time intervals. In order to avoid missing detection of a playback stopping instruction caused between different time intervals, the time intervals may also be allowed to be partially overlapped.

Certainly, detecting whether the first duration during which the instruction used for playing the sample sound file is not received reaches the preset value is only one of manners for detecting the time point for ending the continuous playback. The time point for ending the continuous playback may also be obtained in a manner of detecting a playback time value of a final playback instruction.

In step S103: the system may search, according to the time point for ending the continuous playback, for a playback time value of the sample sound file corresponding to the time point.

In a case in which the sample sound file is a single sound file, the step of searching, according to the time point for ending the continuous playback, for a playback time value of the sample sound file corresponding to the time point includes: obtaining a value of second duration during which the continuous playback is started until the time point for ending the continuous playback; and calculating, according to playback duration of the single sample sound file and the found value of the second duration, the playback time value of the sample sound file corresponding to the time for ending the continuous playback.

The value of the second duration is a value of duration during which the continuous playback is started until the time point for ending the continuous playback. The remainder operation is performed on the playback duration of the single sound file by the value of the second duration to obtain the playback time value of the sample sound file corresponding to the time point for ending the continuous playback.

When the sample sound file is multiple sound files, a playback time of a sound file in the sample sound file corresponding to the value of the second duration is obtained according to the playback duration of the multiple sound files and a playback order.

Figure 2:
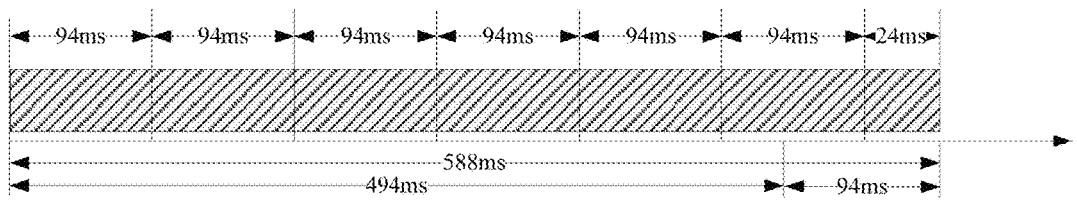
FIG. 2 is a schematic diagram of a playback time corresponding to a time point for ending loop playback when a single sound file is played in a loop manner according to the first embodiment of the present invention.

In a case in which the sample file is a single sound file, as shown in FIG. 2, playback duration of the single sound file may be 94 milliseconds. Assuming that first duration is 94 milliseconds and no new playback instruction is received since the 494th millisecond, a value of second duration is 588 milliseconds, and a playback time value of the sample sound file corresponding to the time point for ending the continuous playback is a remainder of 588/94, that is, 24 milliseconds.

Figure 3:
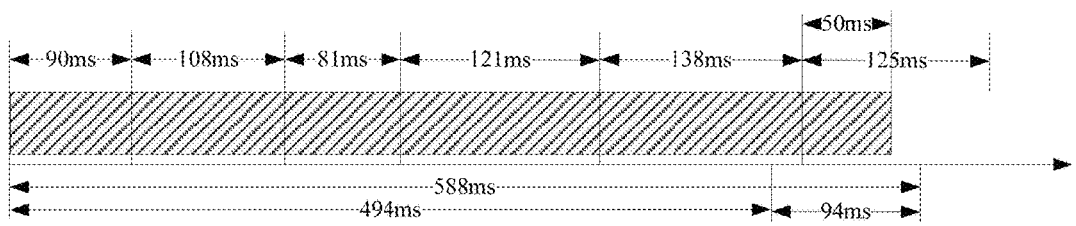
FIG. 3 is a schematic diagram of a playback time corresponding to a time point for ending loop playback when multiple sound files are played in a loop manner according to the first embodiment of the present invention.

In a case in which the sample file is multiple sound files, as shown in FIG. 3, the multiple sound files sequentially are 90 milliseconds, 108 milliseconds, 81 milliseconds, 121 milliseconds, 138 milliseconds, 125 milliseconds, 119 milliseconds, 97 milliseconds, and so on according to a playback order of the multiple sound files, and set first duration is a fixed value of 94 milliseconds. If no new playback instruction is received since the 494th millisecond, a value of second duration is 588 milliseconds, and a playback time value of the sample sound file corresponding to the time point for ending the continuous playback is: 588−90−108−81−121−138=50 milliseconds.

In step S104: the system may start, at the time point for ending the continuous playback, to play sound data of the sample sound file after the playback time value.

Sound data of the sample sound file after an end time value is obtained according to the end time value of the sample sound file corresponding to the time point for ending the continuous playback and found in step S103, and the sound data of the sample sound file after the end time value is started to be played at the time point for ending the continuous playback.

As shown in FIG. 2, sound data, beginning from the 24th millisecond, of the sample sound file is started to be played at the time point for ending the continuous playback. As shown in FIG. 3, sound data, beginning from the 50th millisecond, of the sixth sound file in the sample sound file is started to be played at the time point for ending the continuous playback.

In order to further improve smooth transition performance of the sound and improve a simulation effect, the step of starting, at the time point for ending the continuous playback, to play sound data of the sample sound file after the playback time value may specifically be: starting, at the time point for ending the continuous playback, to play the sound data of the sample sound file after the playback time value, and after the sound data of the sample sound file after the playback time value is played, further playing the sound data that is used for ending the sample sound file naturally. The simulation effect is further improved by adding the sound data for ending the sample sound file naturally, for example, a sound effect is produced according to an environment, such as an echo effect.

In this embodiment of the present invention, when a sound file is played continuously, a time point for ending continuous playback is determined according to a first playback instruction used for loop playback, and a playback time value of a sample sound file is found according to the time point for ending the continuous playback, so that sound data of the sample sound file after the playback time value can be played continuously at the time point for ending the continuous playback; and compared with the existing technology, smooth transition performance of a sound signal can be better improved and simulation performance of a natural sound effect can be enhanced.

Embodiment 2

Figure 4:
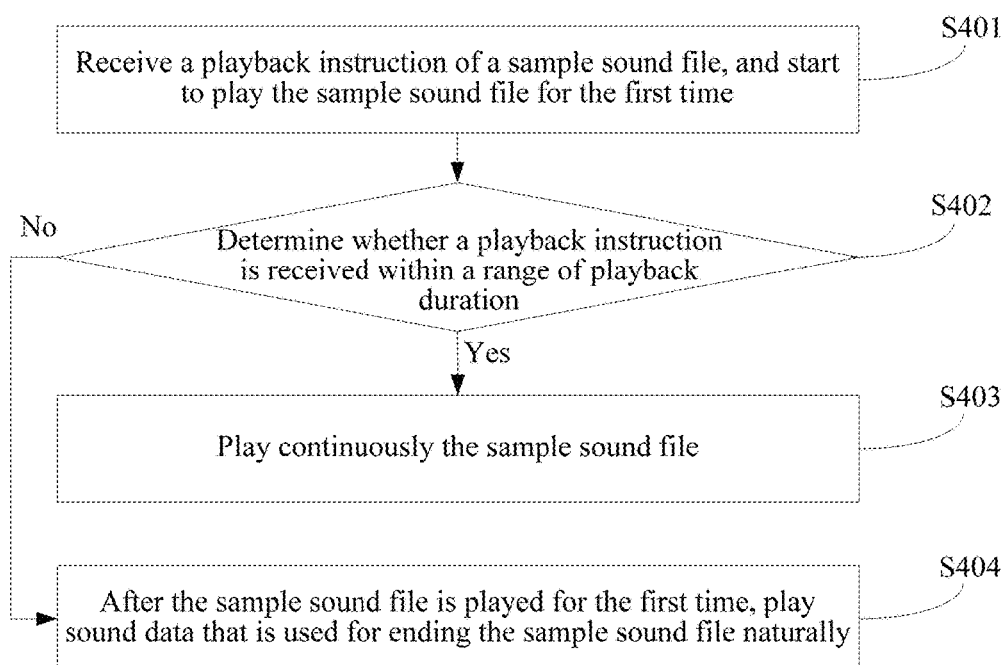
FIG. 4 is a flowchart of continuous playback of a sound file according to a second embodiment of the present invention.

FIG. 4 shows an implementation process of continuous playback of a sound file according to a second embodiment of the present invention, which is described in detail as follows.

In step S401: the system may receive a playback instruction of a sample sound file, and start to play the sample sound file for the first time.

Compared with the first playback instruction in Embodiment 1, the playback instruction of the sample sound file in this embodiment of the present invention is an instruction before the first playback instruction, and differences between them include: the playback instruction is step S401 is used for starting to play the sample sound file for the first time, while the first playback instruction in Embodiment 1 is used for playing the sample sound file continuously.

In step S402: the system may determine whether a playback instruction used for playing the sample sound file is received within a range of playback duration during which the sample sound file is played for the first time.

In step S403: if the playback instruction used for playing the sample sound file is received within the range of playback duration during which the sample sound file is played for the first time, play continuously the sample sound file.

Certainly, this is only one of methods for playing continuously the sample sound file. The preset value in the first embodiment may also be used for detecting whether duration from a current time to a final instruction for playing the sound file is greater than the preset value, and therefore continuous playback of the sample sound file is entered.

The playback instruction of the sample sound file is received at a time point at which the time is 0, and the sample sound file is started to be played for the first time. Playback duration of the sample sound file is 100 milliseconds (greater than a playback duration value of 94 milliseconds of a single sample sound file when being played continuously), and it is listened to whether there is a new playback instruction from a time point of the 0th millisecond to a time point of the 100th millisecond, and if there is a new playback instruction, the sample sound file is played continuously. In a same way, when the preset value in the first embodiment is used, it may be listened to whether there is a new playback instruction based on a playback duration value of 94 milliseconds of a single sample sound file when the sample sound file is played continuously.

In step S404: if the playback instruction used for playing the sample sound file is not received within the range of playback duration during which the sample sound file is played for the first time, after the sample sound file is played for the first time, play sound data that is used for ending the sample sound file naturally.

Figure 5:
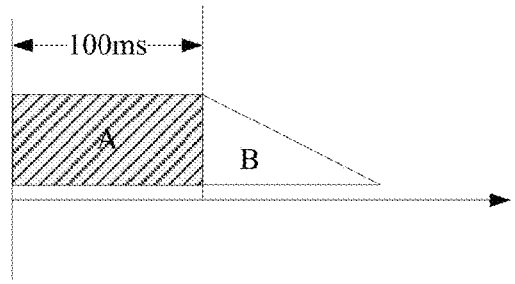
FIG. 5 is a schematic diagram of playing discontinuously a single sound file according to the second embodiment of the present invention.

As shown in FIG. 5, when no new playback instruction is received within a range of playback duration A of 100 milliseconds (which may be set to 94 milliseconds based on the preset value) during which the sample sound file is played for the first time, continuous playback of the sound file is not entered. Sound data B that is used for ending the sample sound file naturally is played, such as a sound having an environment effect, so as to enhance simulation performance.

Embodiment 3

Figure 6:
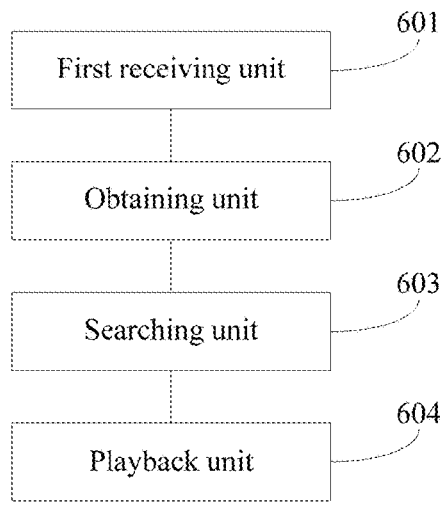
FIG. 6 is a structural block diagram of an apparatus for continuous playback of a sound file according to a third embodiment of the present invention.

FIG. 6 is a structural block diagram of an apparatus for continuous playback of a sound file according to a third embodiment of the present invention; which is described in detail as follows:

The apparatus for continuous playback of a sound file in this embodiment of the present invention is used for playing continuously a sample sound file, and the apparatus includes a first receiving unit 601, an obtaining unit 602, a searching unit 603, and a playback unit 604.

The first receiving unit 601 is configured to receive a first playback instruction, where the first playback instruction is used for playing continuously the sample sound file; The obtaining unit 602 is configured to obtain, according to the first playback instruction received by the first receiving unit 601, a time point for ending continuous playback corresponding to the first playback instruction.

The searching unit 603 is configured to search, according to the time point for ending the continuous playback obtained by the obtaining unit 602, for a playback time value of the sample sound file corresponding to the time point. The playback unit 604 is configured to start to play, according to the time point for ending the continuous playback found by the searching unit 603, sound data of the sample sound file after the playback time value.

Further, the obtaining unit 602 includes: a detecting subunit, configured to detect whether first duration during which an instruction used for playing the sample sound file is not received is greater than a preset value; and a selecting subunit, configured to: if the first duration during which an instruction used for playing the sample sound file is not received is greater than the preset value, select a corresponding time point, at which the first duration during which an instruction used for playing the sample sound file is not received is equal to the preset value, as the time point for ending the continuous playback.

Optionally, the preset value is playback duration of a single sample sound file when being played continuously.

Further, the searching unit 603 includes: an obtaining subunit, configured to obtain a value of second duration during which the continuous playback is started until the time point for ending the continuous playback; and a calculating subunit, configured to calculate, according to playback duration of a single sample sound file and the found value of the second duration, the playback time value of the sample sound file corresponding to the time for ending the continuous playback.

Further, the apparatus further includes: a second receiving unit, configured to receive a playback instruction of the sample sound file, and start to play the sample sound file for the first time; a determining unit, configured to determine whether a playback instruction used for playing the sample sound file is received within a range of playback duration during which the sample sound file is played for the first time; and a continuous playback unit, configured to: if the playback instruction used for playing the sample sound file is received within the range of playback duration during which the sample sound file is played for the first time, play continuously the sample sound file.

Further, the apparatus further includes: a playback unit, configured to: if the playback instruction used for playing the sample sound file is not received within the range of playback duration during which the sample sound file is played for the first time, after the sample sound file is played for the first time, play sound data that is used for ending the sample sound file naturally.

Optionally, the playback unit is specifically configured to: start, at the time point for ending the continuous playback, to play the sound data of the sample sound file after the playback time value, and after the sound data of the sample sound file after the playback time value is played, further play the sound data that is used for ending the sample sound file naturally.

The apparatus for continuous playback of a sound file in this embodiment of the present invention corresponds to the methods in Embodiment 1 and Embodiment 2, which are not described herein again.

Embodiment 4

Figure 7:
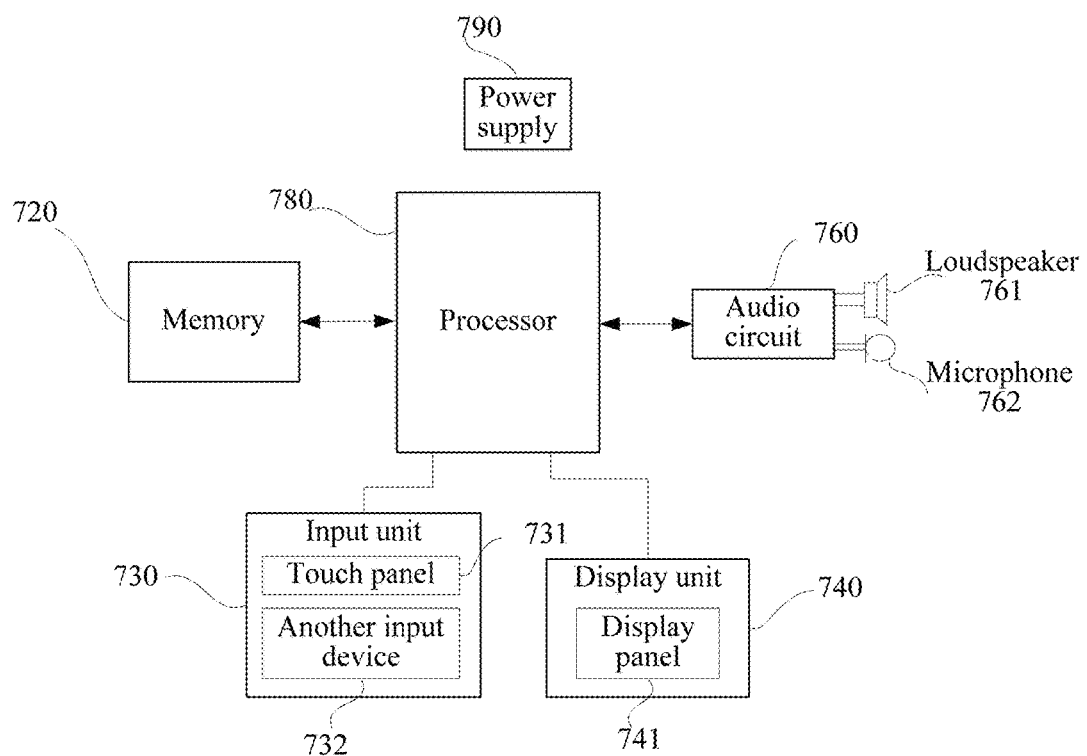
FIG. 7 is a structural block diagram of a terminal according to a fourth embodiment of the present invention.

FIG. 7 is a structural block diagram of a terminal device according to a fourth embodiment of the present invention. The terminal device in this embodiment includes components such as a memory 720, an input unit 730, a display unit 740, an audio circuit 760, a processor 780, and a power supply 790. A person skilled in the art may understand that the structure of the terminal device shown in FIG. 7 does not constitute a limitation to the terminal device, and the terminal device may include more components or fewer components than those shown in the figure, or some components may be combined, or a different component deployment may be used. Each component part of the terminal device is described below in detail with reference to FIG. 7.

The memory 720 may be configured to store a software program and module. The processor 780 runs the software program and module stored in the memory 720, to implement various functional applications and data processing of the terminal device. The memory 720 may mainly include a program storage area and a data storage area. The program storage area may store an operating system, an application program required by at least one function (such as a sound playback function and an image display function), and the like. The data storage area may store data (such as audio data and an address book) created according to use of the terminal device, and the like. In addition, the memory 720 may include a high speed random access memory, and may also include a non-volatile memory, such as at least one magnetic disk storage device, a flash memory, or another volatile solid storage device.

The input unit 730 may be configured to receive input digit or character information, and generate key signal input related to the user setting and function control of the terminal device. Specifically, the input unit 730 may include a touch panel 731 and another input device 732. The touch panel 731 may also be referred to as a touch screen, and may collect a touch operation of a user on or near the touch panel (such as an operation of a user on or near the touch panel 731 by using any suitable object or attachment, such as a finger or a touch pen), and drive a corresponding connection apparatus according to a preset program. Optionally, the touch panel 731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 780. Moreover, the touch controller can receive and execute a command sent from the processor 780. In addition, the touch panel 731 may be implemented by using various types, such as a resistive type, a capacitance type, an infrared type, and a surface sound wave type. In addition to the touch panel 731, the input unit 730 may further include the another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various menus of the terminal device. The display unit 740 may include a display panel 741. Optionally, the display panel 741 may be configured by using a liquid crystal display (LCD), an organic light-emitting diode (OLED), or the like. Further, the touch panel 731 may cover the display panel 741. After detecting a touch operation on or near the touch panel 731, the touch panel 731 transfers the touch operation to the processor 780, so as to determine a type of a touch event. Then, the processor 780 provides corresponding visual output on the display panel 741 according to the type of the touch event. Although, in FIG. 7, the touch panel 731 and the display panel 741 are used as two separate parts to implement input and output functions of the terminal device, in some embodiments, the touch panel 731 and the display panel 741 may be integrated to implement the input and output functions of the terminal device.

The audio circuit 760, a loudspeaker 761, and a microphone 762 may provide audio interfaces between the user and the terminal device. The audio circuit 760 may transmit, to the loudspeaker 761, an electric signal converted from received audio data. The loudspeaker 761 converts the electric signal into a sound signal for output. On the other hand, the microphone 762 converts a collected sound signal into an electric signal. The audio circuit 760 receives the electric signal and converts the electric signal into audio data, and outputs the audio data to the processor 780 for processing. Then, the processor 780 sends the audio data to, for example, another terminal device by using a network module 710, or outputs the audio data to the memory 720 for further processing.

The processor 780 is a control center of the terminal device, and connects to various parts of the terminal device by using various interfaces and lines. By running or executing the software program and/or module stored in the memory 720, and invoking data stored in the memory 720, the processor 780 performs various functions and data processing of the terminal device, thereby performing overall monitoring on the terminal device. Optionally, the processor 780 may include one or more processing units. Preferably, the processor 780 may integrate an application processor and a modem. The application processor mainly processes an operating system, a user interface, an application program, and the like. The modem mainly processes wireless communication. It may be understood that, the foregoing modem may also not be integrated into the processor 780.

The terminal device further includes the power supply 790 (such as a battery) for supplying power to the components. Preferably, the power supply may logically connect to the processor 780 by using a power supply management system, thereby implementing functions, such as charging, discharging, and power consumption management, by using the power supply management system.

Although not shown in the figure, the terminal device may further include a camera, a Bluetooth module, a network module, and the like, which are not further described herein.

In this embodiment of the present invention, the processor 780 included in the terminal device further has the following function: executing a method for continuous playback of a sound file, used for playing continuously a sample sound file, including: receiving a first playback instruction, where the first playback instruction is used for playing continuously the sample sound file; obtaining, according to the first playback instruction, a time point for ending continuous playback corresponding to the first playback instruction; searching, according to the time point for ending the continuous playback, for a playback time value of the sample sound file corresponding to the time point; and starting, at the time point for ending the continuous playback, to play sound data of the sample sound file after the playback time value.

The sequence numbers of the above embodiments of the disclosure are only for the purpose of description, and do not represent one embodiment is superior to another.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for continuous playback of a sample sound file, used for playing continuously repeatedly the sample sound file for providing a smooth transition without intermediate sound pause phenomenon, the method comprising:

at a terminal device having one or more processors and memory storing programs executed by the one or more processors:

receiving a first playback instruction, the first playback instruction including a time point for ending the continuous playback, wherein the time point for ending the continuous playback is an end point of a currently playing sample sound file;

calculating, according to the time point for ending the continuous playback, a repeating number of times and a playback time value of the sample sound file, wherein when a time duration specified in the first playback instruction represents a dividend and a time duration of the sample sound file represents a divisor, the repeating number of times is a quotient and the playback time value is a remainder;

repeatedly playing the sample sound file for the repeating number of times equal to the quotient; and after repeatedly playing the sample sound file for the repeating number of times equal to the quotient, playing sound data of the sample sound file for the playback time value equal to the remainder from a beginning of the sample sound file, wherein when the sample sound file is a single sound file, a continuous playback refers to playing repeatedly the single sound file in a loop manner.

2. The method according to claim 1, further comprising:
detecting whether a first duration during which the first playback instruction is not received is greater than a preset value;
if the first duration is greater than the preset value, selecting a corresponding time point, at which the first duration is equal to the preset value, as the time point for ending the continuous playback.

3. The method according to claim 2, wherein when the sample sound file is the single sound file, the preset value is a playback duration of the single sound file when being played continuously.

4. The method according to claim 1, wherein the method further comprises:
receiving the first playback instruction of the sample sound file, and starting to play the sample sound file for the first time;
determining whether the first playback instruction used for playing the sample sound file is received within a range of playback duration during which the sample sound file is played for the first time; and
if the first playback instruction used for playing the sample sound file is received within the range of playback duration during which the sample sound file is played for the first time, playing continuously the sample sound file.

5. The method according to claim 4, wherein after determining whether the first playback instruction used for playing the sample sound file is received within the range of playback duration during which the sample sound file is played for the first time, the method further comprises:
if the first playback instruction used for playing the sample sound file is not received within the range of playback duration during which the sample sound file is played for the first time, after the sample sound file is played for the first time, playing sound data that is used for ending the sample sound file naturally.

6. The method according to claim 1, wherein playing sound data of the sample sound file for the playback time value equal to the remainder includes:
starting, at the time point for ending the continuous playback, to play the sound data of the sample sound file for the playback time value, and after the sound data of the sample sound file for the playback time value is played, further playing the sound data that is used for ending the sample sound file naturally.

7. The method according to claim 6, wherein the sound data that is used for ending the sample sound file naturally comprises an echo effect sound data.

8. A terminal device for continuous playback of a sample sound file, configured to play continuously repeatedly the sample sound file for providing a smooth transition without intermediate sound pause phenomenon, the terminal device comprising:
a processor; and
a memory coupled to the processor, wherein the processor is configured to:
receive a first playback instruction, the first playback instruction including a time point for ending the continuous playback, wherein the time point for ending the continuous playback is an end point of a currently playing sample sound file;
calculate, according to the time point for ending the continuous playback, a repeating number of times and a playback time value of the sample sound file, wherein when a time duration specified in the first playback instruction represents a dividend and a time duration of the sample sound file represents a divisor, the repeating number of times is a quotient and the playback time value is a remainder;
repeatedly play the sample sound file for the repeating number of times equal to the quotient; and
after repeatedly playing the sample sound file for the repeating number of times equal to the quotient, play sound data of the sample sound file for the playback time value equal to the remainder from a beginning of the sample sound file,
wherein when the sample sound file is a single sound file, a continuous playback refers to playing repeatedly the single sound file in a loop manner.

9. The terminal device according to claim 8, wherein the processor is further configured to:
detect whether a first duration during which the first playback instruction is not received is greater than a preset value;
if the first duration is greater than the preset value, select a corresponding time point, at which the first duration is equal to the preset value, as the time point for ending the continuous playback.

10. The terminal device according to claim 9, wherein when the sample sound file is a single sound file, the preset value is playback duration of the single sound file when being played continuously.

11. The terminal device according to claim 8, the processor is further configured to:
receive the first playback instruction of the sample sound file, and start to play the sample sound file for the first time;
determine whether the first playback instruction used for playing the sample sound file is received within a range of playback duration during which the sample sound file is played for the first time; and
if the first playback instruction used for playing the sample sound file is received within the range of playback duration during which the sample sound file is played for the first time, play continuously the sample sound file.

12. The terminal device according to claim 11, wherein the processor is further configured to:
if the first playback instruction used for playing the sample sound file is not received within the range of playback duration during which the sample sound file is played for the first time, after the sample sound file is played for the first time, play sound data that is used for ending the sample sound file naturally.

13. The terminal device according to claim 8, wherein, the processor further configured to:
start, at the time point for ending the continuous playback, to play the sound data of the sample sound file for the playback time value, and after the sound data of the sample sound file for the playback time value is played, further play the sound data that is used for ending the sample sound file naturally.

14. The terminal device according to claim 13, wherein the sound data that is used for ending the sample sound file naturally comprises an echo effect sound data.

15. A non-transitory computer readable storage medium having stored therein one or more instructions, which, when executed by a terminal device, cause the terminal device to perform a method for providing a smooth transition without intermediate sound pause phenomenon, including:
- receiving a first playback instruction, the first playback instruction including a time point for ending the continuous playback, wherein the time point for ending the continuous playback is an end point of a currently playing sample sound file;
- calculating, according to the time point for ending the continuous playback, a repeating number of times and a playback time value of the sample sound file corresponding to the time point, wherein when a time duration specified in the first playback instruction represents a dividend and a time duration of the sample sound file represents a divisor, the repeating number of times is a quotient and the playback time value is a remainder;
- repeatedly playing the sample sound file for the repeating number of times equal to the quotient; and
- after repeatedly playing the sample sound file for the repeating number of times equal to the quotient, playing sound data of the sample sound file for the playback time value equal to the remainder from a beginning of the sample sound file,
- wherein when the sample sound file is a single sound file, a continuous playback refers to playing repeatedly the single sound file in a loop manner.

16. The non-transitory computer readable storage medium according to claim 15, wherein the method further comprises:
- detecting whether a first duration during which the first playback instruction is greater than a preset value;
- if the first duration is greater than the preset value, selecting a corresponding time point, at which the first duration is equal to the preset value, as the time point for ending the continuous playback.

17. The non-transitory computer readable storage medium according to claim 16, wherein when the sample sound file is the single sound file, the preset value is a playback duration of the single sound file when being played continuously.

18. The non-transitory computer readable storage medium according to claim 15, wherein the method further comprises:
- receiving the first playback instruction of the sample sound file, and starting to play the sample sound file for the first time;
- determining whether the first playback instruction used for playing the sample sound file is received within a range of playback duration during which the sample sound file is played for the first time; and
- if the first playback instruction used for playing the sample sound file is received within the range of playback duration during which the sample sound file is played for the first time, playing continuously the sample sound file.

19. The non-transitory computer readable storage medium according to claim 18, wherein after determining whether the first playback instruction used for playing the sample sound file is received within the range of playback duration during which the sample sound file is played for the first time, the method further comprises:
- if the first playback instruction used for playing the sample sound file is not received within the range of playback duration during which the sample sound file is played for the first time, after the sample sound file is played for the first time, playing sound data that is used for ending the sample sound file naturally.

* * * * *